(12) United States Patent
Tegen

(10) Patent No.: US 7,584,688 B1
(45) Date of Patent: Sep. 8, 2009

(54) MULTIPLE-BLADE SAW SYSTEM WITH MAGNETIC BEARING GUIDE BLOCKS AND FERROMAGNETIC LUBRICANT, COOLANT AND COATING SYSTEM

(76) Inventor: Mark G. Tegen, P.O. Box 1296, Tacoma, WA (US) 98401

( * ) Notice: Subject to any disclaimer, the term of this patent is extended or adjusted under 35 U.S.C. 154(b) by 475 days.

(21) Appl. No.: 11/261,040

(22) Filed: Oct. 28, 2005

(51) Int. Cl.
*B26D 5/00* (2006.01)

(52) U.S. Cl. .............................. 83/523; 83/169; 83/820; 83/821; 83/824

(58) Field of Classification Search .................. 83/523, 83/821, 824, 169, 170, 171, 820, 425.2, 425.3, 83/508.3, 177
See application file for complete search history.

(56) References Cited

U.S. PATENT DOCUMENTS

| | | | |
|---|---|---|---|
| 3,273,612 A * | 9/1966 | Keddie | 83/761 |
| 4,635,513 A | 1/1987 | McGeehee | |
| 4,848,200 A | 7/1989 | McGeehee | |
| 4,961,359 A * | 10/1990 | Dunham | 83/169 |
| 5,159,866 A * | 11/1992 | Dunham | 83/169 |
| 5,921,162 A * | 7/1999 | Jackson et al. | 83/829 |
| 6,756,715 B2 * | 6/2004 | Hirose et al. | 310/90 |

FOREIGN PATENT DOCUMENTS

| | | | |
|---|---|---|---|
| CA | 2561041 | * | 4/2007 |
| RU | 2242355 C1 | * | 7/2003 |

* cited by examiner

*Primary Examiner*—Boyer D Ashley
*Assistant Examiner*—Omar Flores Sánchez
(74) *Attorney, Agent, or Firm*—Brian J. Coyne

(57) ABSTRACT

Improved saw guide block and fluid for a multiple blade saw assembly. Individual guide blocks are disposed between adjacent saw blades, which blades are mounted on a common drive shaft and axially spaced. Each of the guide blocks has a pair of oppositely-directed block pads that create a magnetically-padded bearing surface. Each block pad includes magnetic portions and non magnetic portions. Each non magnetic portion has fluid delivery ports to allow the transport of ferromagnetic, lubricant, coolant, coating fluid to the magnetically-padded bearing surfaces. The magnetic portion forms a magnetic field of attraction in its vicinity for capture and adherence of ferromagnetic particles within the fluid, whereby a magnetic coating on the guide block bearings surfaces is continuously regenerated during operation of the saw assembly.

25 Claims, 4 Drawing Sheets

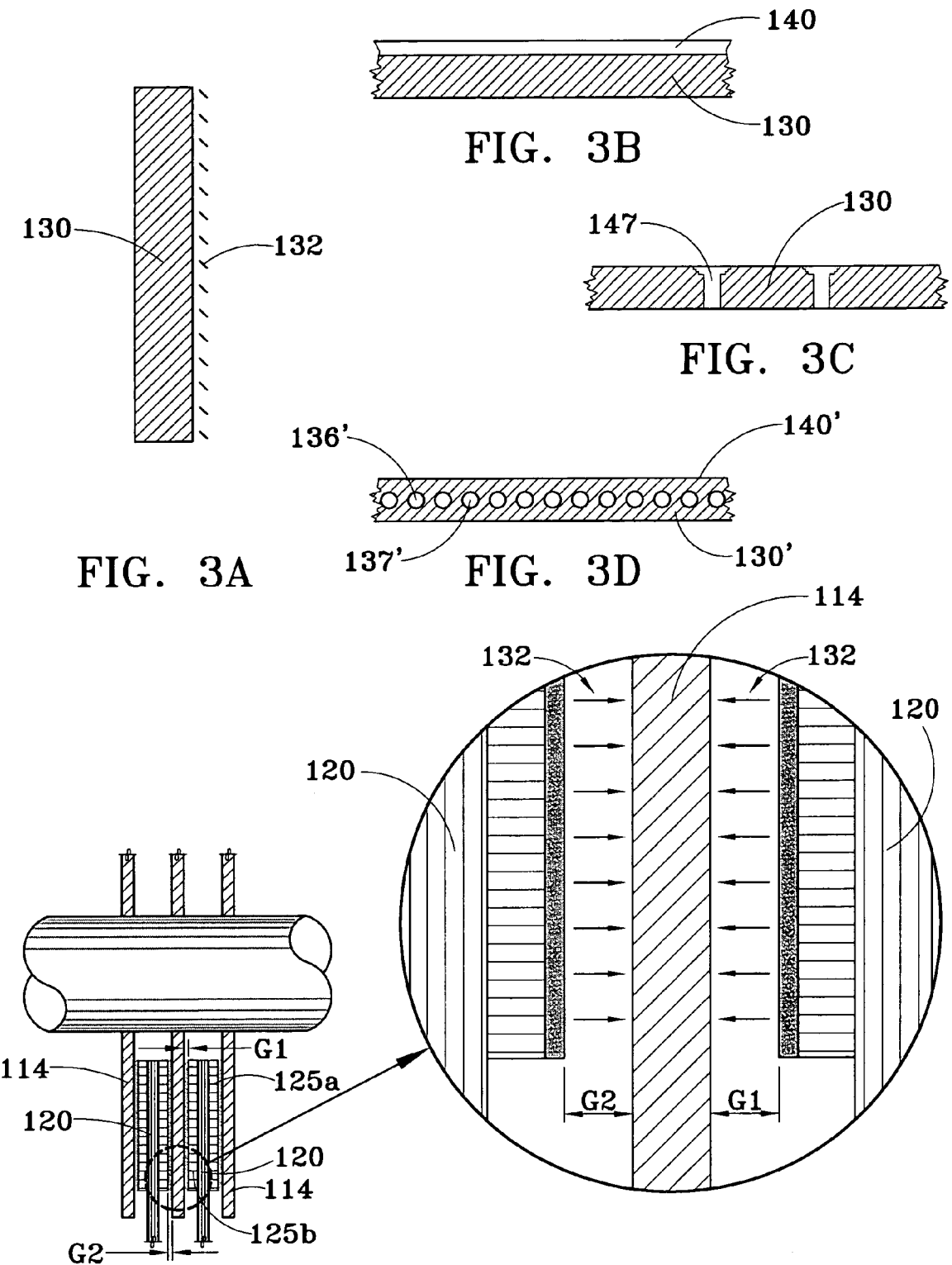

MULTIPLE-BLADE SAW SYSTEM WITH MAGNETIC BEARING GUIDE BLOCKS AND FERROMAGNETIC LUBRICANT, COOLANT AND COATING SYSTEM

BACKGROUND OF THE INVENTION

1. Field of the Invention

The present invention relates to multiple-blade saw systems with saw guide lubricating systems and, more particularly, to a multiple-blade saw system having a magnetic bearing guide surface and a ferromagnetic lubricant, coolant and coating fluid which allows for continuous regeneration of the saw bearing guide surface with ferromagnetic particles.

2. General Background

Multiple blade saw systems used in the lumber industry use very thin circular saw blades which tend to warp and deform during use. Therefore, mechanisms have been deployed to prevent warping and deformation of the blades. It is common for guiding systems to use large babbitt saw guide blocks which typically require large amounts of cooling water to cool both the saw blades and saw guide blocks while the saws are cutting.

Under the current operating conditions, temperature is controlled through the introduction of cooling fluids to the blade and guide interface. However, the current systems, operating under current conditions, do not generate enough heat to allow extreme pressure lubricant additives such as chlorine or sulfur to effectively minimize the effects of blade and bearing guide impacts through low surface friction metal salt formation. Furthermore, any metal salt formation on the surface of the bearing guide is dependent on the surface height of the remaining metal, which will precipitously decrease as wear occurs and does not effectively address the problem.

In addition, the impacts that do occur degrade the ability of the guide block to keep the axially opposed saw blades on plane and cutting properly. As impact wear occurs on the bearing guide leading edge, trailing edge and additional load points, the ability of the bearing guide to keep the blade spinning on its original plane, especially during impact conditions, is precipitously decreased.

Another attempt at preventing excess accumulation of heat in multiple saw assemblies, with little or no water, is described in U.S. Pat. No. 4,635,513 (incorporated herein by reference as if set forth in full below). In this system a plurality of individual saw guide blocks are provided, each of which include separate channels to deliver water and oil mists to the saw blade. The application of small amounts of lubricating oil to the saw blade reduced the amount of water to cool the blades. The introduction of oil and water mists increased the service life of the saw guides, typically to 100 hours or longer.

The introduction of oil and water mists onto the saw guides is also disclosed in U.S. Pat. No. 4,848,200 (incorporated herein by reference as if set forth in full below). This system also uses a low friction material on the bearing surface to reduce heat generation as the blades are rotated (FIGS. 1 and 2). The combination of oil and water mists and the low friction material has significantly increased the service life of the saw guides, typically to 5,000 to 10,000 hours.

In view of the above, there is a continuing need for a magnetic saw bearing guide surface and ferromagnetic lubricant, coolant and coating fluid for use with multiple-blade saw systems to reduces frequent changes of the guide blocks due to the effects of metal to metal contact as saw blade and bearing surface impact.

For the above reasons, it would be desirable to provide a magnetic bearing guide surface and ferromagnetic lubricant, coolant and coating fluid that will continually regenerate the bearing guide surface to extended the useful life thereof in order to reduce costs associated with frequent changes.

As will be seen more fully below, the present invention is substantially different in structure, methodology and approach from that of prior saw guide lubricating systems.

SUMMARY OF THE PRESENT INVENTION

The preferred embodiment of saw guide block assembly and multi-blade saw system of the present invention solves the aforementioned problems in a straight forward and simple manner.

Broadly, the present invention contemplates a saw guide block assembly for use with a multiple-blade saw system having a plurality of saw blades, each assembly interdigited between individual saw blades, comprising: bearing surfaces formed of magnetic or combination of magnetic and non magnetic material creating a magnetic field of attraction; and, means for delivering a fluid containing ferromagnetic particles to each respective saw blade and said bearing surfaces wherein as said ferromagnetic particles are dispersed in the magnetic field of attraction and adhere to the magnetic material of said bearing surface, a regenerating sacrificial film of particles are created onto the bearing surfaces.

In view of the above, it is an object of the present invention to combine a saw guide block assembly with a magnetically-padded bearing surface and a fluid with ferromagnetic particles to create a magnetic, regenerating sacrificial film that significantly increases the overall durability of the guide block assembly and maintains the integrity thereof.

A further object of the present invention is to use the existing cooling and lubricating fluid as a carrier of ferromagnetic particles to create a ferromagnetic lubricant, coolant and coating fluid.

The present invention further contemplates a multi-blade system that employs the improved guide block assembly and ferromagnetic, lubricant, coolant and coating fluid to create a regenerating sacrificial film of particles on the bearing surfaces.

In view of the above, a feature of the present invention is to provide a multi-blade system and improved guide block assembly that is relatively simple structurally.

The above and other objects and features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein:

FIG. 3A illustrates magnetic material;

FIG. 3B illustrates a bottom magnetic backing layer and top bearing guide surface layer;

FIG. 3C illustrates the magnetic material having fluid delivery ports formed therein;

FIG. 3D illustrates vertical drill holes filled with epoxy in magnetic material;

FIG. 4 illustrates a partial top view of a multi-blade saw assembly with a magnetic saw bearing guide and ferromagnetic lubricant, coolant and coating system in accordance with the present invention depicting the gap between the magnetic saw bearing guide and saw blade;

FIG. 5 illustrates the subject matter circled in FIG. 4;

DETAILED DESCRIPTION OF THE PREFERRED EMBODIMENT

Figure 1:
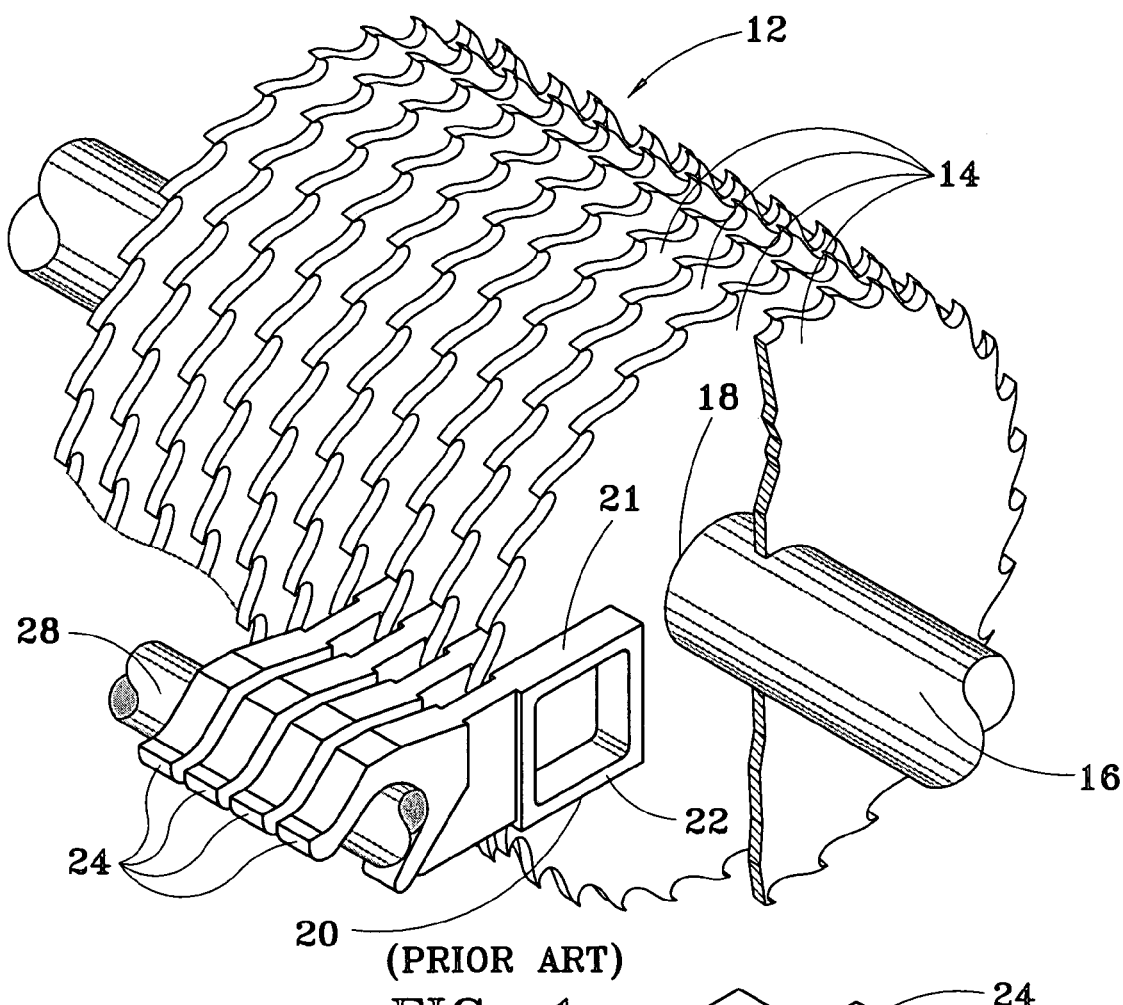
FIG. 1 illustrates a partial perspective view of a multi-blade saw assembly of the prior art.
Figure 2:
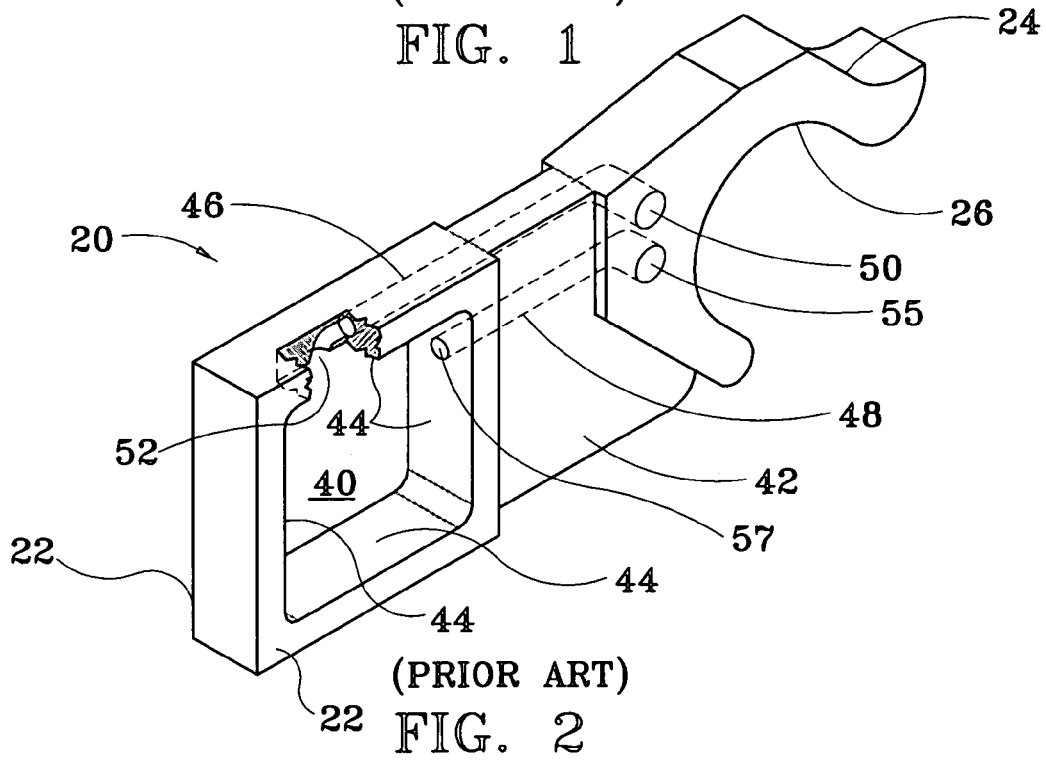
FIG. 2 is an isometric view of the saw guide block of the prior art.

Referring now to FIGS. 1 and 2, and specific reference to U.S. Pat. No. 4,848,200, as is well known in the prior art a multiple blade saw assembly 12 has a plurality of individual saw blades 14 mounted on a common drive shaft 16 and axially spaced therealong. The outer surface of the drive shaft 16 includes axially aligned serrations which engage a similar pattern of serrations in the central hole 18 of the saw blade 14.

Individual guide blocks 20 have bearing blocks 21 which are positioned between adjacent saw blades 14. Moreover, each bearing block 21 includes a pair of bearing surfaces 22 lying immediately adjacent to the face of adjacent saw blades 14. The clearance between the bearing surfaces 22 of the bearing blocks 21 and the saw blades 14 is generally in the range of 0.001 to 0.004 inches. The bearing surfaces 22 are made of a low friction material in order to reduce heat generation as the blades are rotated.

Each saw guide block 20 includes a mounting bracket 24 at the end opposite the bearing surfaces 22. The mounting bracket 24 defines a U-shaped clamp 26 which is received on a guide support rod 28. The mounting brackets 24 slidably receive the support rod 28 and may be individually raised from between the adjacent saw blades 24 by rotation in a counterclockwise direction.

The mounting bracket 24, extension member 42 and bearing block 21 of the guide block 20 includes passages 46 and 48 for receiving and distributing oil and water, respectively, into chamber 40. While two passages are shown and described only a single passage may be used. Oil and water enter passages 46 and 49 via inlet ports 50 and 55, respectively, and exits via nozzle 52 and outlet port 57.

The present invention comprises an improvement to the conventional saw guide system disclosed in U.S. Pat. No. 4,848,200. Specifically, the present invention provides an improved design of the bearing block 20 wherein a ferromagnetic particle containing liquid is applied to the individual guide blocks 20 so as to constantly regenerate the bearing surfaces 22 as wear occurs, which significantly minimizes, if not virtually eliminates, the need to change the bearing surfaces 22.

Figure 6:
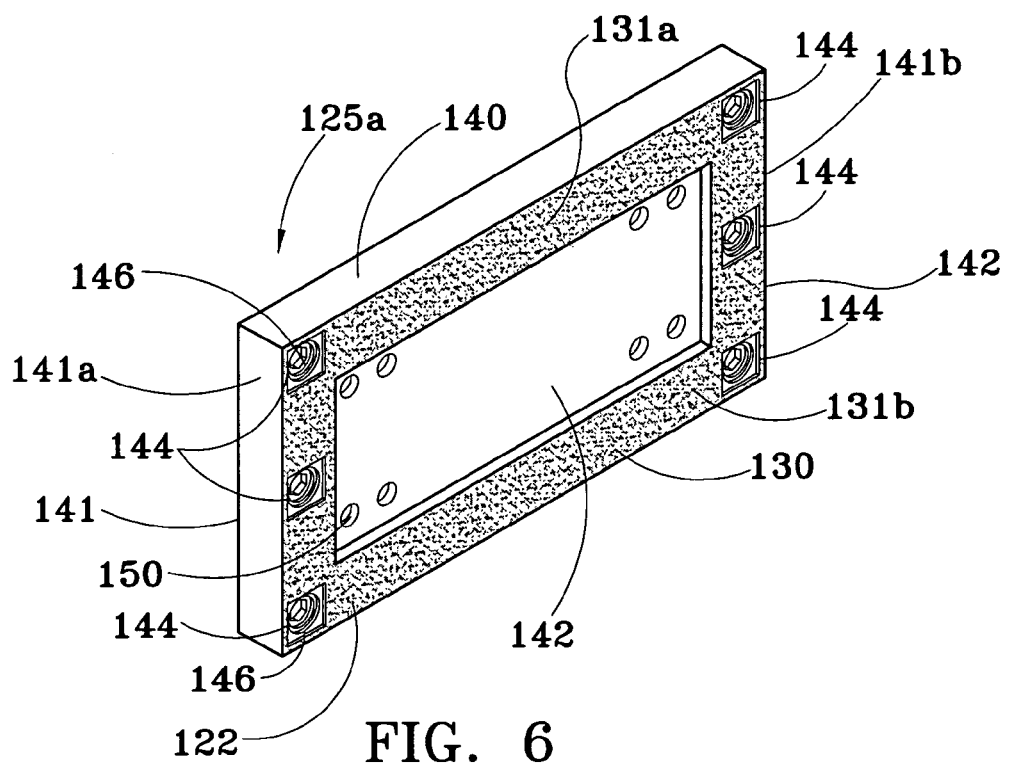
FIG. 6 illustrates a front perspective view of the magnetic saw bearing guide and ferromagnetic lubricant, coolant and coating system in accordance with the present invention.
Figure 7:
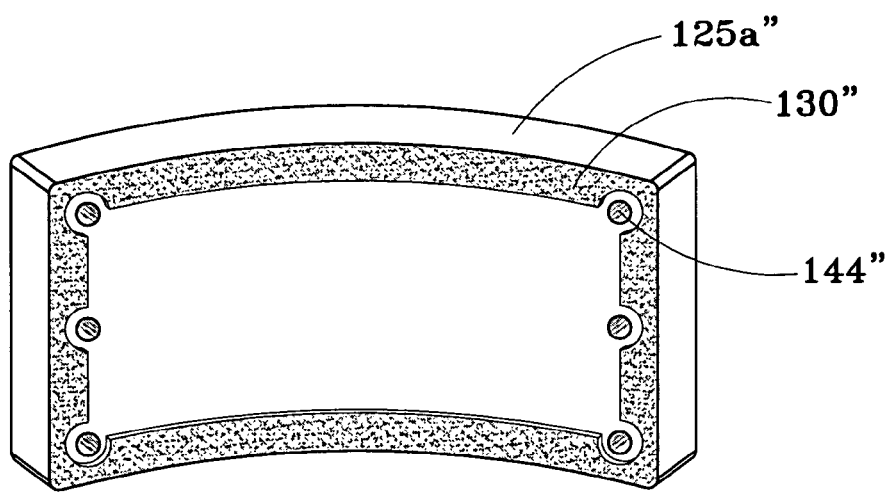
FIG. 7 illustrates a front perspective view of an alternate embodiment of the magnetic saw bearing guide and ferromagnetic lubricant, coolant and coating system in accordance with the present invention; and, FIG. 8 illustrates a partial perspective view of a multi-blade saw assembly of the present invention.

With reference to FIGS. 4-6, each improved guide block assembly 120 is comprised of a guide block 20, such as shown in FIG. 2, and block pads 125a and 125b that create magnetically-padded bearing surfaces 122 at the bearing interface. Since guide block 20 has been described in detail above no further description is needed.

Since each block pad is essentially the same, only one block pad will be described in detail below. Block pad 125a includes magnetic portions 130 and non magnetic portion 140. The non magnetic portion 140 of the guide block assembly 120 includes a planar substrate 142 of non magnetic material having a plurality of fluid delivery ports 144 designed to allow the transport of the ferromagnetic liquids to the magnetically-padded bearing surfaces 122 where it can be dispersed through the mechanical action of the saw blade 114 in combination with the fluid pressure. The fluid delivery ports 144 are formed by hollow screws 146 which attach the block pad 125a to the guide block 20. The channel in the center of the hollow screw 146 creates a fluid passageway.

In the exemplary embodiment, a fluid delivery port 144 is formed at each corner wherein the outlet of such port 142 traverses the planar substrate 142 of the non magnetic portion 140. Furthermore, fluid delivery ports 144 are formed centrally on the left and right sides of the planar substrate 142 between the top and bottom corner ports 142. As can be appreciated, the passages 46 and 48 may be used for delivery of fluid to ports 144 and/or other passages can be created.

The magnetic portions 130 form a perimeter magnetic frame around the exterior face (the side facing the blade 114) of the non magnetic portion 140 and are secured through epoxy or other means to such exterior face, as best seen in FIG. 3B. Hence, the bearing interface (the side facing the blade 114) of the present invention is a magnetically-padded bearing interface. The magnetic portion 130 produces a magnetic field of attraction 132 in its vicinity.

As best seen in FIGS. 3C and 6, the corners of the perimeter frame have formed therein apertures 147 so that the magnetic material does not overlap or, otherwise, obstruct the flow of fluid through the fluid delivery ports 144. Apertures are also formed in the magnetic material which overlap the fluid delivery ports 144 formed centrally on the trailing and leading sides 141a and 141b.

Referring now to FIG. 3D, in an alternate embodiment, the magnetic portion 130' can be formed by creating a plurality of drill holes 136' in the non magnetic portion 140', the drill holes 136' are filled with magnetic material 137' and epoxy or other means to secure the magnetic material 137' in the drill holes.

The non magnetic portion 140 further includes a plurality of apertures 150 which are formed through the planar substrate 142 and located within the interior perimeter edge of perimeter magnetic frame.

The non magnetic portion 140 and guide block 20 may be made of high hardness metals or simply modify existing soft metal bearing guides in use. Examples of soft metal surfaces include nickel, tin, aluminum, and combinations thereof but not limited thereto.

The magnetic material can be any permanent magnet or electromagnetic material, preferably Neodymium Iron boron alloy, samarium-cobalt, or neodymium in addition to nickel, magnetite, Samarium Cobalt, iron, and boron or combinations thereof, but not limited to the above materials.

The ferromagnetic, lubricant, coolant and coating fluid 105 (hereinafter referred to as the "FLCC fluid 105") contains ferromagnetic particles 107 in a liquid 109. The liquid 109 can be comprised of water, oil or oil and water as the carrier of the ferromagnetic particles 107. Suitable ferromagnetic particles 107 include iron, nickel, cobalt or combinations of the metals or any ferromagnetic combination of metals or metal salts including but not limited to monazite, bastnesite, Montmorillonite, Nontronite, Biotite, Siderite, Pyrite, Maghemite, Jacobsite, Trevorite, Magnesioferrite, Pyrrohotite, Greigite, Feroxyhyte, Awaruite, Wairauite.

In addition, the present invention may contain ferromagnetic particles 107 as well as dispersed polytetraflorethylene, boron nitride, or other solid lubricant used to reduce the surface friction generated during bearing surface 122 and saw blade 114 impact.

A metal deactivator or chelant including Tetrasodium ethylenediaminetetraacetate, and/or diethylenetriaminepentaacetic acid, and/or N-(hydroxyethyl)-ethylenediaminetriacetic acid, and/or nitrilotriacetic acid and/or tetrapotassium pyrophosphate and/or sodium metasilicate can be applied directly to the saw blade cutting surface to prevent metal salt formation on the exposed cutting blade or cutting blade carbide tips.

The FLCC fluid 105 enters the fluid delivery ports 144 and enters the saw blade 114 and bearing interfaces of two adjacent assemblies 120 at a pressure 20-50 PSI. When the FLCC fluid enters gaps G1 and G2 (the space between the saw blade 114 and the magnetically-padded bearing interfaces) a circular vortex of the FLCC fluid 105 is created distributing the FLCC fluid 105 across the padded bearing surfaces 122. In the gaps G1 and G2 the magnetic field of attraction 132 exists.

As a result of the turning of the saw blade 114, the FLCC fluid 105 will migrate out towards the rim of the saw blade 114 and leading and trailing edges 141 and 142 of the block pads 125a and 125b assuring an even distribution of ferromagnetic particles 107 in the magnetic field of attraction 132. The ferromagnetic particles 107 in the FLCC fluid 105 are attracted to the magnetic material of the magnetic portions 130 of the magnetically-padded bearing surfaces 122. The magnetic field of attraction 132 causes the ferromagnetic particles 107 to adhere to the magnetic portions 130 thereby forming a continuously regenerating sacrificial film of ferromagnetic particles onto the magnetic portions 130 of the magnetically-padded bearing surfaces 122 in the event of metal to metal contact of the saw blade 114 and assembly 120.

Referring again to prior art FIG. 2, the guide block 20 is mounted on an extension member 42 attached to the mounting bracket 24. The mounting bracket 24 and extension member 42 are typically steel machined to the desired external dimensions and include certain internal passages 46 and 48. The bearing surfaces 22 are generally formed by casting onto the extension member 42. Heretofore, bearing materials have been low friction metals, glasses or other materials which may be easily molded.

While the guide block assembly 120 includes guide block 20 of the prior art in combination with block pads 125a and 125b, guide block assembly 120 may be made of a single unit with magnetic portions 130 on opposite sides.

Figure 8:
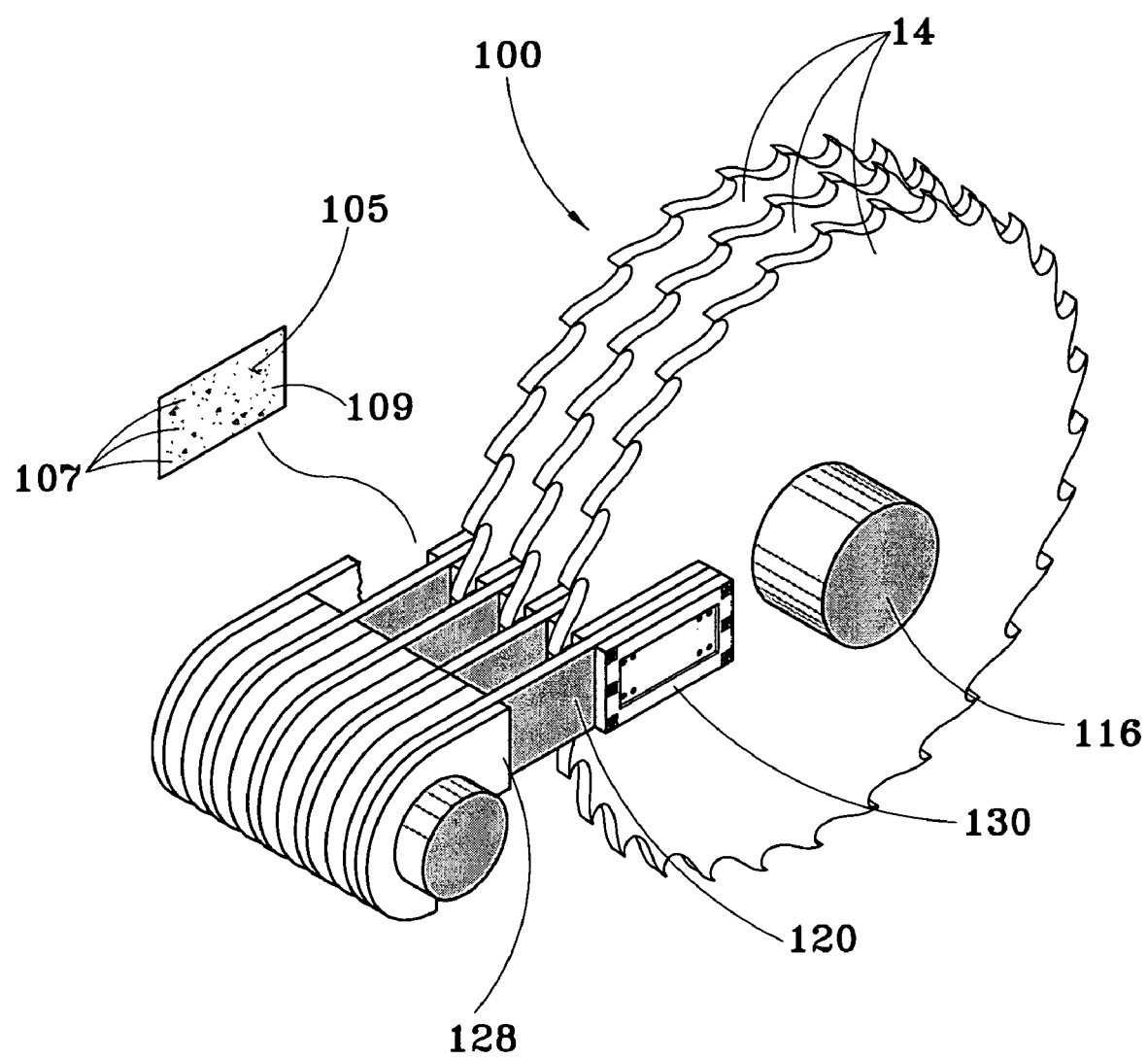

Referring now to FIG. 8, the multiple blade saw assembly 100 of the present invention has a plurality of individual saw blades 114 mounted on a common drive shaft 116 and axially spaced therealong. Improved guide block assemblies 120 (FIGS. 4-6) having magnetically-padded bearing surfaces 122 are positioned between adjacent saw blades 114.

The multiple blade saw assembly 100 of the present invention also includes FLCC fluid 105 attracted to the magnetic material of the magnetic portions 130 of the magnetically-padded bearing surfaces 122. The magnetic field of attraction 132 causes the ferromagnetic particles 107 to adhere to the magnetic portions 130 thereby forming a continuously regenerating sacrificial film of ferromagnetic particles onto the magnetic portions 130 of the magnetically-padded bearing surfaces 122 in the event of metal to metal contact of the saw blade 114 and the magnetically-padded bearing surfaces 122.

Each guide block assembly 120 is received on a guide support rod 128 and may be individually raised from between the adjacent saw blades 114 by rotation in a counterclockwise direction.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A magnetic saw guide system, for use with a multiple-blade saw system having a plurality of saw blades comprising:
   a fluid containing ferromagnetic particles and liquid; and,
   a plurality of saw guide block assemblies interdigited between individual saw blades, each saw guide block assembly comprising:
      bearing surfaces formed of magnetic or combination of magnetic and non magnetic material creating a magnetic field of attraction, and
      fluid delivery ports for applying said fluid to each respective saw blade and said bearing surfaces;
   wherein said ferromagnetic particles are dispersed in the magnetic field of attraction and are attracted to the magnetic material of the bearing surfaces to adhere to the magnetic material to create a regenerating sacrificial film of particles onto the bearing surfaces.

2. The system of claim 1, wherein:
   the liquid is comprised of water, oil or oil and water, and,
   the fluid is a ferromagnetic, lubricant, coolant and coating fluid.

3. The system of claim 2, wherein said each saw guide block assembly further comprises:
   a saw bearing guide block made of a high hardness metal; and
   block pads attached to opposite sides of said saw bearing guide block, and each block pad includes a respective one bearing surface.

4. The system of claim 3, wherein each block pad comprises:
   a planar substrate of non magnetic material; and,
   attached to said substrate, a perimeter frame of magnetic material creating a magnetically-padded bearing surface.

5. The system of claim 4, wherein:
   said planar substrate has formed at each corner a respective one fluid delivery port; and,
   said perimeter magnetic frame of magnetic material is discontinuous over said fluid delivery port.

6. The system of claim 5, wherein:
   said planar substrate has a plurality of apertures formed within the area bounded by the interior edge of the perimeter magnetic frame.

7. The system of claim 1, wherein said each saw guide block assembly further comprises:
   a saw bearing guide block made of a soft metal.

8. The system of claim 7, wherein said soft metal includes nickel, tin, aluminum, or a combination thereof.

9. The system of claim 1, wherein said ferromagnetic particles include iron, nickel, cobalt or combinations of the metals or any ferromagnetic combinations of metals or metal salts including monazite, bastnesite, Montmorillonite, Nontronite, Biotite, Siderite, Pyrite, Maghemite, Jacobsite, Trevorite, Magnesioferrite, Pyrrohotite, Greigite, Feroxyhyte, Awaruite, or Wairauite.

10. The system of claim 1, wherein said fluid further comprises dispersed polytetraflorethylene, boron nitride, or other solid lubricant used to reduce the surface friction.

11. The system of claim 1, further comprising:
a metal deactivator adapted to be applied directly to each individual saw blade cutting surface to prevent metal salt formation thereon.

12. The system of claim 11, wherein the metal deactivator includes Tetrasodium ethylenediaminetetraacetate, diethylenetriaminepentaacetic acid, N-(hydroxyethyl)-ethylenediaminetriacetic acid, nitrilotriacetic acid, tetrapotassium pyrophosphate, or sodium metasilicate or a combination thereof.

13. A multiple-blade saw system comprising:
a plurality of saw blades;
a fluid containing ferromagnetic particles and liquid; and
a plurality of saw guide block assemblies interdigited between individual saw blades, each saw guide block assembly comprising:
bearing surfaces formed of magnetic or combination magnetic and non magnetic material creating a magnetic field of attraction, and
fluid delivery ports for applying said fluid to each respective saw blade and said bearing surfaces;
wherein said ferromagnetic particles are dispersed in the magnetic field of attraction and are attracted to the magnetic material of the bearing surfaces to adhere to the magnetic material to create a regenerating sacrificial film of particles onto the bearing surfaces.

14. The system of claim 13, wherein:
the liquid is comprised of water, oil or oil and water; and,
the fluid is a ferromagnetic, lubricant, coolant and coating fluid.

15. The system of claim 13, wherein said each saw guide block assembly further comprises:
a saw bearing guide block made of a high hardness metal; and
block pads attached to opposite sides of said saw bearing guide block, each block pad includes a respective one bearing surface.

16. The system of claim 13, wherein each block pad comprises:
a planar substrate of non magnetic material; and,
a perimeter frame of magnetic material creating a magnetically-padded bearing surface.

17. The system of claim 16, wherein:
said planar substrate has formed at each corner a respective one fluid delivery port; and,
said perimeter magnetic frame of magnetic material is discontinuous over said fluid delivery port.

18. The system of claim 17, wherein:
said planar substrate has a plurality of apertures formed within the area bounded by the interior edge of the perimeter magnetic frame.

19. The system of claim 13, wherein said each saw guide block assembly further comprises:
a saw bearing guide block made of a soft metal.

20. The system of claim 19, wherein said soft metal includes nickel, tin, aluminum, or a combination thereof.

21. The system of claim 13, wherein said ferromagnetic particles include iron, nickel, cobalt or combinations of the metals or any ferromagnetic combination of metals or metal salts including monazite, bastnesite, Montmorillonite, Nontronite, Biotite, Siderite, Pyrite, Maghemite, Jacobsite, Trevorite, Magnesioferrite, Pyrrohotite, Greigite, Feroxyhyte, Awaruite, or Wairauite.

22. The system of claim 13, wherein said fluid further comprises dispersed polytetraflorethylene, boron nitride, or other solid lubricant used to reduce the surface friction.

23. The system of claim 13, further comprising:
a metal deactivator adapted to be applied directly to each individual saw blade cutting surface to prevent metal salt formation thereon.

24. The system of claim 23, wherein the metal deactivator includes Tetrasodium ethylenediaminetetraacetate, diethylenetriaminepentaacetic acid, N-(hydroxyethyl)-ethylenediaminetriacetic acid, nitrilotriacetic acid, tetrapotassium pyrophosphate, or sodium metasilicate or a combination thereof.

25. A saw guide block assembly for use with a multiple-blade saw system having a plurality of saw blades, each assembly interdigited between individual saw blades, comprising:
bearing surfaces formed of magnetic or combination of magnetic and non magnetic material creating a magnetic field of attraction; and
means for delivering a fluid containing ferromagnetic particles to each respective saw blade and said bearing surfaces;
wherein as said ferromagnetic particles are dispersed in the magnetic field of attraction and adhere to the magnetic material of said bearing surface, a regenerating sacrificial film of particles is created onto the bearing surface.

* * * * *